United States Patent
Tang et al.

(10) Patent No.: US 7,376,115 B2
(45) Date of Patent: May 20, 2008

(54) METHOD FOR GENERATION OF TRAINING SEQUENCE IN CHANNEL ESTIMATION

(75) Inventors: Wei Tang, Guangdong (CN); Zhaohui Cai, Guangdong (CN); Zexian Li, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 744 days.

(21) Appl. No.: 10/297,530

(22) PCT Filed: May 24, 2001

(86) PCT No.: PCT/CN01/00860

§ 371 (c)(1),
(2), (4) Date: Aug. 8, 2003

(87) PCT Pub. No.: WO01/97419

PCT Pub. Date: Dec. 20, 2001

(65) Prior Publication Data

US 2004/0032849 A1 Feb. 19, 2004

(30) Foreign Application Priority Data

Jun. 7, 2000 (CN) ............................... 00 1 08007

(51) Int. Cl.
*H04B 7/216* (2006.01)
*H04Q 7/00* (2006.01)
*H04B 1/00* (2006.01)

(52) U.S. Cl. .................. 370/342; 370/328; 375/140

(58) Field of Classification Search .......... 370/310, 370/320, 321, 335, 342, 328, 329; 375/130, 375/131, 140, 141, 142, 147, 148, 149, 150, 375/152, 153

See application file for complete search history.

(56) References Cited

U.S. PATENT DOCUMENTS

| | | | | |
|---|---|---|---|---|
| 6,526,036 | B1 * | 2/2003 | Uchida et al. | 370/342 |
| 6,542,484 | B1 * | 4/2003 | Ovesjo et al. | 370/335 |
| 6,631,124 | B1 * | 10/2003 | Koorapaty et al. | 370/337 |
| 6,963,546 | B2 * | 11/2005 | Misra et al. | 370/294 |

OTHER PUBLICATIONS

Steiner, Bernd and Jung, Peter; "Uplink Channel Estimation in Synchronous CDMA Mobile Radio Systems With Joint Detection"; Personal, Indoor, and Mobile Radio Communications (Sep. 8-11, 1993); pp. 1-5.*
3rd Generation Partnership Project; Technical Specification Group Radio Access Network; Physical channels and mapping of transport channels onto physical channels (TDD); Release 1999.*

* cited by examiner

*Primary Examiner*—Hassan Kizou
*Assistant Examiner*—Betty Lee
(74) *Attorney, Agent, or Firm*—Marshall, Gerstein & Borun LLP

(57) ABSTRACT

The embodiments of the present invention discloses a method for generating training sequence in channel estimation, including dynamically determining the length of the channel impulse response of each subscriber respectively according to a real number of subscribers at a specific time burst and/or a channel estimation state of each subscriber prior to a specific time burst; generating a training sequence for each subscriber respectively from a basic code according to the length of the channel impulse response of each subscriber; and allocating the training sequence to each subscriber at the specific time burst. The embodiments of the invention can obtain better effect of channel estimation, thereby decreasing code error rate, enhancing quality of receiving signal in the system and improving communication performance.

7 Claims, 2 Drawing Sheets

METHOD FOR GENERATION OF TRAINING SEQUENCE IN CHANNEL ESTIMATION

FIELD OF THE TECHNOLOGY

The present invention relates generally to wireless communication technologies, and more particularly to a method for generating a training sequence in channel estimation.

BACKGROUND OF THE INVENTION

It is different from a TDMA or CDMA system, in a TD-CDMA system each time-slot includes several code channels, which are used to distinguish different subscribers in the same time-slot. Applying hybrid TDMA and CDMA mode has performance advantage than the only TDMA or CDMA mode. In a TD-CDMA system, a receiver not only needs to separate different time-slots in each frame, but also needs to separate different code channels in the same time-slot with correlation methods. With these methods, different channels can be differentiated at the receiving end. After transmission, a signal, sent by the transmitting end of a system, will be put in interference by the space time-variant channel, where the signal passes through. In addition, multipath interference of a mobile channel and the channel itself also causes intersymbol interference (ISI) and multiple access interference (MAI). In order to recover correctly a transmitted signal at the receiving end, it is necessary to obtain the channel impulse response. With the received signal and the channel impulse response, a transmitted signal will be correctly estimated. Therefore, quality of channel estimation occupies a pivotal position for a system performance.

In a modern wireless communication system, because of multipath fading and time delay spread a received digital signal, which has been passed through a radio channel, has frequency selective fading, time selective fading, wave distortion and lower signal-to-noise ratio. Therefore, it is difficult to recover a transmitted signal at the receiving end. In many systems, training sequence (called preamble code or midamble code, according to their position) is used to estimate the channel. Obviously, generating method of a training sequence is very important.

Reference [1], Bernd Steiner and Peter Jung: "Uplink Channel Estimation in Synchronous CDMA Mobile Radio Systems with Joint Detection", PIMRC'93, discloses a maximum likelihood non-deviated channel estimation method and a matching filter deviated channel estimation method. At the same time, reference [1] has provided a training sequence generating method, which considers that training sequences for different subscribers in a same time-slot are based on a same basic code or cycle basic code, with different time shifting each other. In reference [1], it is supposed that channel impulse response of each subscriber should have same length, so relative time shifting of training sequence code of each subscriber is an equal interval.

For the present technology as shown in reference [1], FIG. 1 and FIG. 2 show diagrams of different subscribers training sequences which are obtained by shifting the basic code sequentially. Wherein the offset of generated training sequence from the basic code corresponds to the estimated window length. In this case, whether the real subscriber number reaches the maximum subscriber number, estimated window length of each subscriber all selects W, i.e. corresponding to the maximum subscriber number situation.

In FIG. 1, the basic code is non-cyclic. The estimated window length is $W = P/K$, wherein K is the maximum subscribers number working simultaneously, and P is length of the basic code. In FIG. 2, the basic code is cyclic. The estimated window length is $W = P/K$, wherein K is the maximum subscribers number working simultaneously, and P is period of the basic code. When selecting cyclic basic code, processing complexity of channel estimation at receiving end will be simplified. For method of the invention, two basic code cases are no difference in principle.

The generating methods of a training sequence from a basic code, mentioned above, are all supposed that channel impulse response of every subscriber has the same length, and relative time shift between training sequences of every subscriber has equal interval. This kind of generating methods cannot fully develop the channel estimation advantage, so it is unavoidable that the communication system performance will be affected.

SUMMARY OF THE INVENTION

An embodiment of the present invention provides a generating method for training sequence in channel estimation, which includes dynamically determining offsets of training sequences from a basic code for subscribers respectively, according to a number of subscribers at a specific time burst and/or a channel estimation state of each subscriber prior to the specific time burst; generating training sequences for subscribers respectively from a basic code according to the determined offset of each subscriber; and allocating the training sequences to each subscriber at the specific time burst or directly allocating the offsets to each subscriber at the specific time burst.

Preferably, the minimum difference of the offsets of two subscribers should be made as long as possible.

The embodiments of the present invention propose a training sequence generating method, which dynamically selects a training sequence according to the system working state. In this method, according to environment where subscribers are located and the channel situation, a base station dynamically selects training sequences and allocates to every subscriber. Purposes of the training sequences selection are to make the channel estimation window length as long as possible, to use resource thoroughly, to estimate channel more accurately and to make the system capacity as large as possible.

Although the embodiments of the present invention mainly point to the CDMA wireless communication system, the embodiments also can be used in a FDMA and TDMA system with similar transmission architecture. According to the embodiments, any engineer skilled the art of signal processing and communication, etc. can design training sequences for different subscribers.

EMBODIMENTS OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
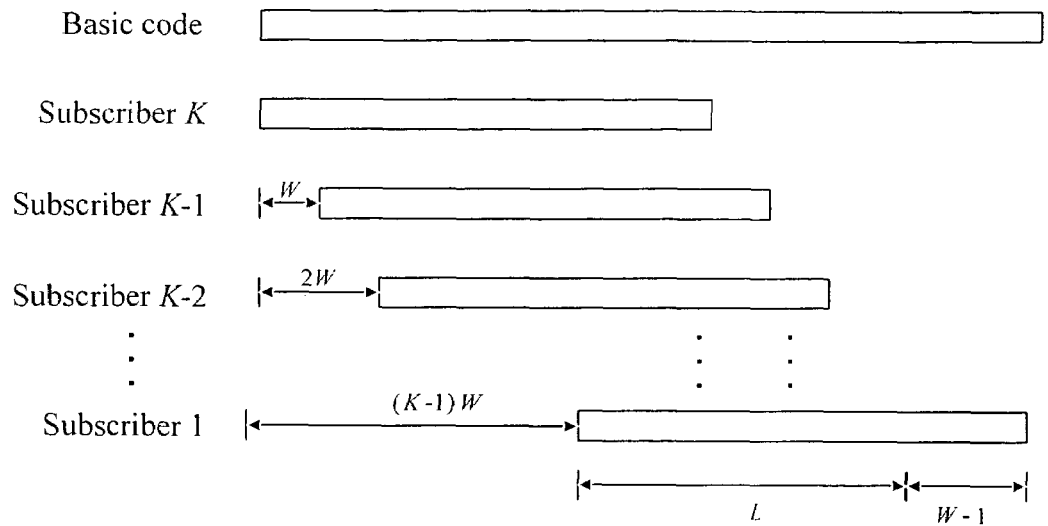
FIG. 1 shows a diagram that generates training sequences from a non-cyclic basic code of prior art.
Figure 2:
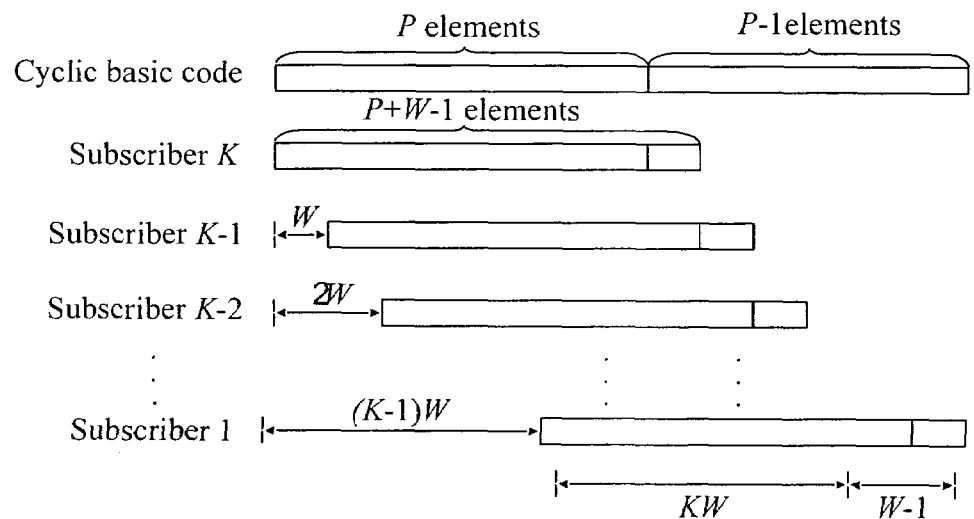
FIG. 2 shows a diagram that generates training sequences from a cyclic basic code of prior art.
Figure 3A:
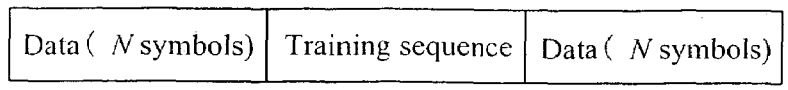
FIG. 3*a* shows an embodiment of the invention, a time burst structure at the transmitting end.

FIG. 3a shows a transmitted burst structure for TD-CDMA. In general, a link means that a burst signal to be transmitted, after processed by a transmitting filter, is passed through a radio channel to reach a receiver. Taking fixed length of a transmission channel delay spread is W, then each burst structure at least includes a data block and a predefined training sequence block. In general, channel estimation by using training sequence is performed by solving the equations consisted by the known training sequences and the received signal vector. The purpose of the embodiment is to propose a method for generating and allocating training sequence.

Figure 3B:
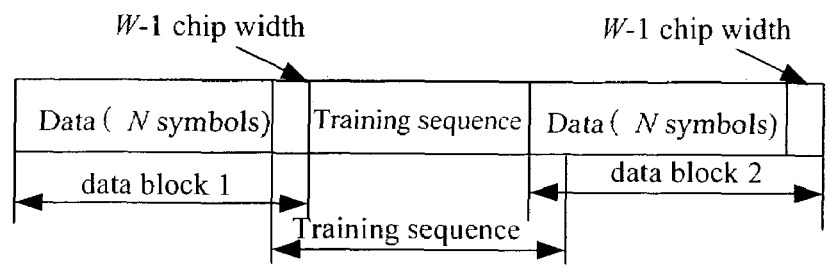
FIG. 3*b* shows an embodiment of the invention, a time burst structure at the receiving end.

FIG. 3a shows a transmitted burst structure for TD-CDMA. The burst structure includes two data blocks and one training sequence block, and the two data blocks, data block 1 and data block 2, are separated by the training sequence block located at the middle. Suppose it is selected that fixed delay spread of a channel is W code chips width, then the received burst structure at receiving end is as shown in FIG. 3b. Wherein, part of received signal (W−1 code chips length) of data block 1 is moved to the corresponding part of received training sequence, and part of received training sequence is also moved to the received data block 2.

In the following, a midamble code is taken as an example to describe a training sequence selection. The embodiment is not limited to a midamble code selection. The embodiment is appropriate to training sequence selection for any channel estimation based on training sequence, and is also appropriate for generating training sequence from cyclic basic code or non-cyclic basic code.

Suppose there are K radio subscribers in a system, then the discussed system model has K radio channels. Suppose the complex number impulse response is:

$$h^{(k)}=(h_1^{(k)},h_2^{(k)} \ldots h_w^{(k)})^T, k=1 \ldots K \qquad (1)$$

wherein the length is W.

When the K subscribers channel response is written in a vector form, it is:

$$h=(h^{(1)T},h^{(2)T} \ldots h^{(K)T})^T \qquad (2)$$

The total number of unknown channel coefficients is:

$$U=KW \qquad (3)$$

the training sequence of $k^{th}$ subscriber is:

$$m^{(k)}=(m_1^{(k)},m_2^{(k)} \ldots m_{L+W-1}^{(k)})^T, k=1 \ldots K \qquad (4)$$

Since it is supposed that the length of the channel impulse response is W, the channel ISI is caused by the last W−1 elements of data symbols in the data block. Initial W−1 samples of the received signal are affected by the delay signal of the training sequence, i.e. there is ISI, so they are not taken as part of the channel estimation. Therefore, energy of the initial W−1 elements of each training sequence is not completely used for channel estimation. The receiving signal defined uniquely by the training sequence itself has only L elements.

Suppose the real receiving signal is:

$$e=(e_1,e_2 \ldots e_L)^T \qquad (5)$$

According to the training sequence $m^{(k)}$ of formula (4), the L × W matrix is:

$$G^{(k)}=(G_{ij}^{(k)}), k=1 \ldots K \qquad (6a)$$

$$G_{ij}^{(k)}=m_{W+i-j}^{(k)}, i=1 \ldots L; j=1 \ldots W \qquad (6b)$$

The L × U matrix G is:

$$G=(G^{(1)},G^{(2)} \ldots G^{(K)}) \qquad (7)$$

wherein the additive stationary noise with zero average value is $$n=(n_1,n_2 \ldots n_L)^T \qquad (8)$$

Therefore, the received signal is expressed as $$e=Gh+n \qquad (9)$$

It is seen that in real the channel estimation corresponds to solve h from the formula (9) with the Known G and e. Wherein the G is a matrix consisted of every subscriber training sequence, and vector e is a received signal corresponding to the training sequence part.

In reference [1], in order to decrease system resource as much as possible, a special generating mode of a training sequence is applied. The generating mode is that: in a same time-slot, midamble codes of different subscribers are generated based on a same basic code or cyclic basic code, and between the midamble codes, there are different time shifting mutually.

Suppose:

$$m=(m_1,m_2, \ldots, m_{L_m+(K-1)W})^T,$$

$m_i \in \{1,-1\}; i=1, \ldots, (L_m+(K-1)W)$ represents a subscriber basic code, wherein $m_i=m_{i-P}, i=(P+1), \ldots, (L_m+(K-1)W)$, $L_m$ is the length of midamble code, P=KW is period of the basic code, and W is the channel estimated window size (i.e. length of channel impulse response). Then, K different subscribes midamble is generated by formula:

$$m_i^{(k)}=m_{i+(K-k)W}, i=1, \ldots, L_m; k=1, \ldots, K.$$

Therefore, each column of matrix G in formula (7) is obtained from one training sequence $m_i$ with different shifts, i.e. matrix G is a cyclic matrix.

With this midamble, multi-subscribers' channel estimation can be implemented by one correlation operation. In this case, offset W is an important parameter when selecting subscriber midamble, and at a definite physical layer the offset should be definite. In practice, selection of W needs to consider the following factors: length of midamble code $L_m$ in a frame; period P of the selected cyclic basic code; maximum subscriber number K, working simultaneously, in one time-slot; delay spread of a mobile channel W'; before shifting, number of midamble codes, used simultaneously.

Suppose maximum subscriber number, working simultaneously in one time-slot, is K, then the selecting procedure of the channel impulse response length W should be:

1. in order to implement rapidly channel estimation, according to the maximum likelihood channel estimation method (reference [1]) the constructed estimation matrix should be a cyclic matrix. First, there should be W=⌊P/K⌋, wherein "⌊ ⌋" means a taking lower integer operation.

2. $L+W-1=L_m$ should be satisfied; wherein L is column number of the estimation matrix (i.e. chip number received at the receiving end and used for channel estimation), and $L_m$ is length of the midamble code.

3. In order to have solution of the estimation, it should be satisfied that $L \geq KW$.

4. Decide whether the W value satisfies application requirement.

In this procedure, the subscriber number decides the possible W values. On the one hand, during a system real working procedure the channel delay spread is possibly larger, according to several typical channel models for mobile communication system provided by ITU - R M.1225. On the other hand, length of a midamble code in data frame format is limited, because channel is time varying, transmission efficiency and transmission rate etc. should be considered. Consequently, when the maximum subscribers number working simultaneously is larger than a certain number, the selected W value will be less than real delay spread of the channel W'. If a subscriber channel is W' >W, then on the one hand since part of the information is lost, so the estimated value is not accurate, on the other hand there is interference to channel estimation of the subscriber taking adjacent shifted midamble.

During selecting offset of subscriber midamble codes, the selected W value should be adaptive. According to different number of subscribers and/or specific channel condition, each subscriber W value and relative position are adjusted accordingly, in order to make length (i.e. offset) of a channel estimation window is longest for as many as possible subscribers.

In summary, when each subscriber selects midamble, the selecting strategy of W value and midamble code offset sequence number are:

For existing subscribers with a certain number, the midamble code distance is as far as possible. For a newly added subscriber, according to the selected training sequences of existing subscribers and each channel delay spread of existing subscribers, selects the most suitable midamble code offset sequence number.

In the following, three embodiments of the training sequence generating method will be describe specifically by taking one time-slot has one basic code as an example. Wherein K represents the maximum number of simultaneously working subscribers, k represents specific offset sequence number, P represents period of the selected cyclic basic code and $L_m$ represents length of the midamble code. The three embodiments are:

(1) When the number of simultaneously working subscribers M is equal or less than K, i.e. $M \leq K$; then at the beginning, length of W takes $\lfloor P/M \rfloor$, k=1, ..., M; during working according to the different delay spread of each subscriber, the network can re-adjusts offset W(k), k = 1, ..., M, in order to make that a subscriber with smaller channel delay spread occupies a smaller offset, and a subscriber with larger channel delay spread occupies a larger offset. If a subscriber withdraws, then a newly added subscriber will take the position. This is a complete adaptive situation.

(2) When the number of simultaneously working subscribers M is equal or less than K, i.e. $M \leq K$; and length of W for each subscriber is the same and takes $\lfloor P/M \rfloor$; then along with changing of the number of subscribers, the length of W is changed. The allocated subscriber number in each time-slot can be informed to every subscriber through the common channel broadcast or other ways.

(3) Setting several levels for different subscribers numbers, each level is corresponded to one kind of subscribers number and is allocated with a fixed estimated window length. For example, taking K/2 as a limit, then there are two levels. When the subscribers number is greater then K/2, W takes $\lfloor P/K \rfloor$ value; and when the subscribers number is less then K/2, W takes $\lfloor 2P/K \rfloor$ value.

Figure 4:
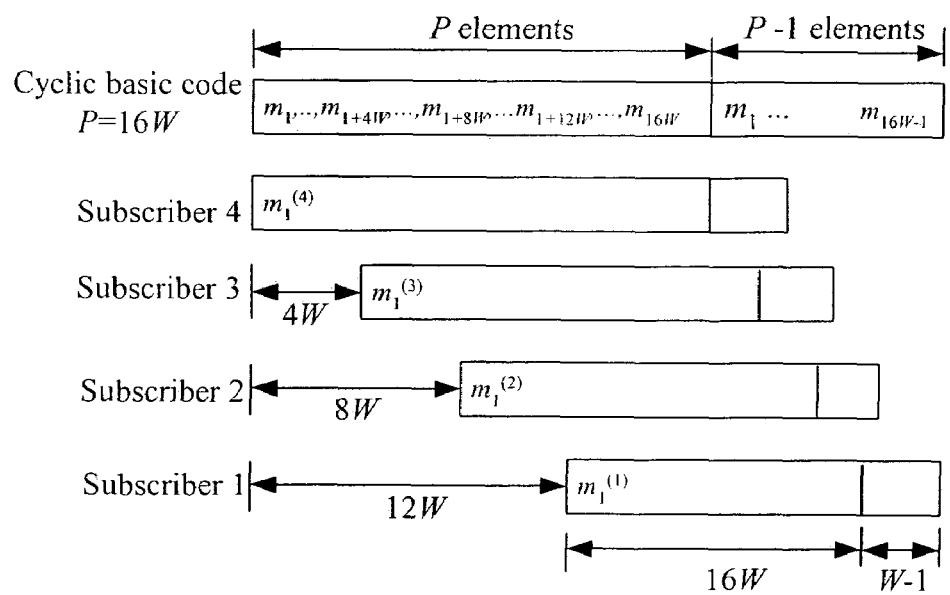
FIG. 4 shows an embodiment of the invention, a method for generating different subscriber training sequences from a same cyclic basic code.

FIG. 4 shows an adaptive generating method of training sequence, whereof the maximum number of subscribers is 16, and the real number of subscribers is 4. The basic code $m_i$ represents a definite sequence, which can be a pseudo-random sequence or can be generated by a computer. In this case, 4W are adaptively selected as the length of each channel estimation window, and it is not W as in the 16 subscribers situation. Increasing length of estimation window raises the channel estimation accuracy.

Based on the above mention, it is definite that when the training sequence length is fixed, the channel impulse response length can be defined by the simultaneously working subscribers in a time-slot, and training sequence of each subscriber can be obtained at the same time. For example, suppose that in each burst the training sequence length is 144 bits or code chips (in spread spectrum system), length of the cyclic basic code is 128 bits or code chips, and the maximum subscribers, working simultaneously, at a time-slot is 16; then according to the formula KW = P, W is 8, i.e. the shift between $K^{th}$ subscriber training sequence and $(K-1)^{th}$ training sequence is 8. Of course, when the maximum subscribers working simultaneously at a time-slot is decreased to half, a shift between different subscribers can be double, and so on. A compromise between performance and complexity can be selected by a subscriber and applied in a real system.

In a real system, different generating methods can be applied. This means that training sequences generated at a base station satisfy the following two conditions:

(1) in a definite number of existing subscribers taking midamble code with distance as far as possible;

(2) for newly added subscriber, according to delay of the existing subscribers, selecting suitable midamble code.

For example, when the number of subscribers is less than 8, then a newly added subscriber takes, in sequence, midamble code of the sequence number 1, 3, 5, 7, 9, 11, 13, and 15. When a subscriber is withdrawn, then a newly added subscriber will take the midamble code of the withdrawn subscriber. When the number of subscriber is greater than 8, then a newly added subscriber takes midamble code of the sequence number that is the sequence number of the existing subscriber with a shortest one of the channel impulse response length W' plus one. Here, it is supposed that increasing the direction of the sequence number is consistent with the shift direction. In some examples, a channel impulse response length W' can be obtained from the channel estimation value directly. Another method is, at the beginning, an added subscriber takes 1, 9, 5, 13, 3, 7, 11 and 15 sequentially. All of these are examples of a training sequence generating method.

The embodiment of the present invention provides a training sequence generating method that is suitable to a wireless communication system, especially to the WCDMA - TDD (wideband CDMA - time division duplex) system, the TD - SCDMA (time division duplex - synchronous CDMA) system and TD - CDMA (time division duplex - CDMA) system. Applying the embodiment, the available resource of a system is used thoroughly, and a better compromise of performance and complexity is obtained.

Although the embodiments mainly point to the CDMA wireless communication system, they also can be used in a communication system with similar transmission architecture. Any engineer skilled in the art of signal processing, communication etc. can design training sequences for different subscribers according to the embodiment.

The embodiments of the present invention are suitable for mobile communication systems working at worse environment, such as vehicle mobile station. When it is used in the third generation mobile communication system, code error rate can be decreased, quality of the receiving signal can be raised, so communication performance is improved.

The embodiments of the present invention are not limited to the midamble selection. They can be used for training sequence selection in any channel estimation based on training sequence, including preamble code selection. In addition, the embodiments of the present invention are not only suitable to a cyclic basic code, but to a non-cyclic basic code as well. The above descriptions mention only some embodiments of the invention, and are by no means to limit the scope of the invention.

The invention claimed is:

1. A method for generating training sequence in channel estimation, comprising:
   dynamically determining offsets of training sequences from a basic code for each of a plurality of subscribers respectively, according to at least one of (1) a number of subscribers at a specific time burst or (2) a real-time channel estimation state of each subscriber;
   generating training sequences for each of the plurality of subscribers respectively from a basic code according to the determined offset of each subscriber; and
   allocating the training sequences to each subscriber at the specific time burst or directly allocating the offsets to each subscriber at the specific time burst.

2. The method according to claim 1, further comprising: making the minimum difference between the offsets of two generated training sequences as big as possible.

3. The method according to claim 1, wherein the basic code is non-cyclic basic code or cyclic basic code.

4. The method according to claim 1, further comprising:
   if the number of simultaneously working subscribers M is equal or less than the maximum number of simultaneously working subscribers K, taking $\lfloor P/M \rfloor$ as the offset of each subscriber, where P represents the length of the basic code; and
   accordingly changing the offset along with the changing of the number of subscribers.

5. The method according to claim 1, further comprising:
   setting several subscribers number levels, wherein each level corresponds to a kind of subscribers number situation, and
   allocating each subscribers number level with a fixed offset, which is longer for levels with less numbers of subscribers.

6. The method according to claim 1, further comprising:
   during working, according to the different channel delay spread of each subscriber, re-adjusting each subscriber offset by a network, to make a subscriber with a smaller channel delay spread occupy a smaller offset and a subscriber with a larger channel delay spread occupy a larger offset; and
   taking the position of a withdrawn subscriber by a newly added subscriber if a subscriber withdraws.

7. The method according to claim 1, wherein the process of generating training sequences for subscribers respectively from a basic code according to the determined offset of each subscriber comprises:
   generating training sequences according to a maximum number of subscribers from a basic code; and
   selecting the training sequences for subscribers respectively from the generated training sequences according to the offsets of the subscribers.

* * * * *

UNITED STATES PATENT AND TRADEMARK OFFICE
CERTIFICATE OF CORRECTION

PATENT NO. : 7,376,115 B2
APPLICATION NO. : 10/297530
DATED : May 20, 2008
INVENTOR(S) : Wei Tang et al.

It is certified that error appears in the above-identified patent and that said Letters Patent is hereby corrected as shown below:

Column 2, line 24: delete "a number of subscribers" and insert --the number of subscribers--.

Column 7, line 25: delete "a number of subscribers" and insert --the number of subscribers--.

Signed and Sealed this
Twenty-fifth Day of January, 2011

David J. Kappos
*Director of the United States Patent and Trademark Office*